United States Patent [19]
Williams

[11] 3,740,077
[45] June 19, 1973

[54] SHIFTABLE FOOTING FOR TRAILERS

[76] Inventor: Russell T. Williams, 8009 S. Lakeridge Road, Seattle, Wash. 98178

[22] Filed: May 8, 1972

[21] Appl. No.: 251,014

[52] U.S. Cl............... 280/475, 280/477, 180/8 C, 105/368 C
[51] Int. Cl.............................................. B60d 1/00
[58] Field of Search ............... 280/475, 477, 150.5; 180/8 C; 105/368 S; 254/86 R

[56] References Cited
UNITED STATES PATENTS
| | | | |
|---|---|---|---|
| 3,576,225 | 4/1971 | Chambers | 180/8 C R |
| 3,482,847 | 12/1969 | Hart | 280/475 X |
| 3,084,953 | 4/1963 | McGregor | 280/477 X |
| 2,903,977 | 9/1959 | Ulinski | 105/368 S |

Primary Examiner—Leo Friaglia
Assistant Examiner—R. Schrecengost
Attorney—Ford E. Smith

[57] ABSTRACT

A two-part footing is disclosed to provide a broad base to receive and support the weight-bearing, levelling leg associated with the two-bar of a trailer. One part of said footing rests upon a ground-engaging base plate and means is provided permitting easy lateral shifting of the supported part and a load borne by it, relative the base plate. A modified form includes a pivotally associated sub-base plate permitting the footing to be revolved about an axis established by the sub-base plate.

7 Claims, 3 Drawing Figures

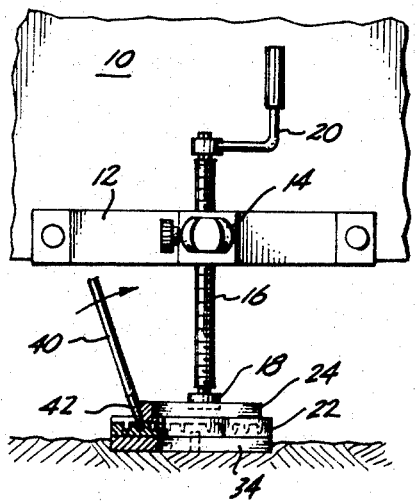
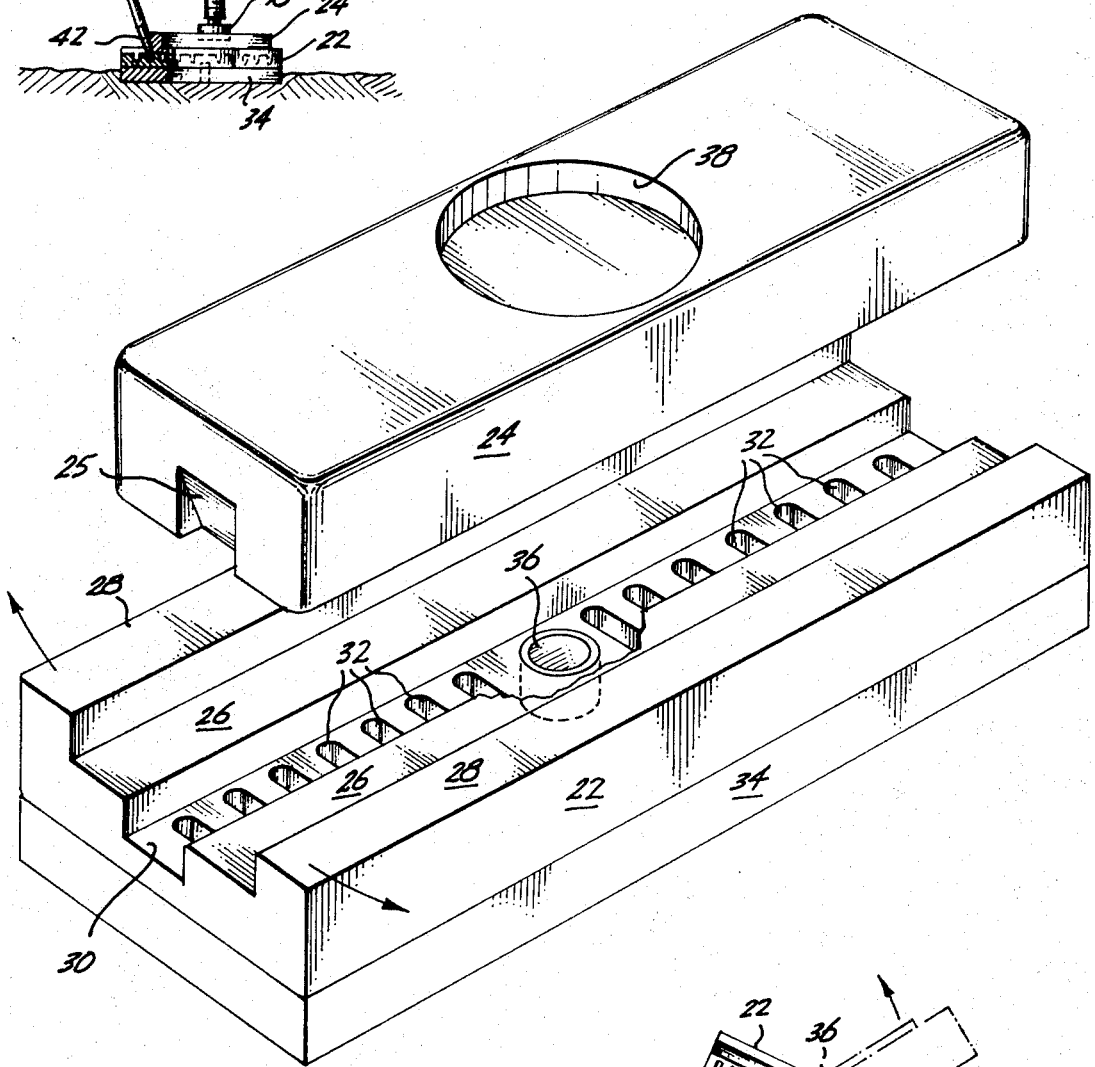
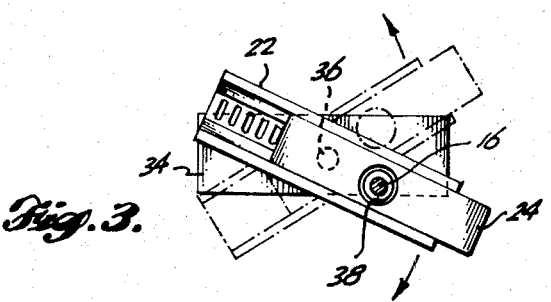

3,740,077

SHIFTABLE FOOTING FOR TRAILERS

BACKGROUND OF THE INVENTION

The coupling of a tractor and a trailer often presents difficulties due to the necessity of obtaining fairly close alignment or positioning of the coupler ball on the tractor and the ball-clamp on the trailer. The usual latitude with respect to permissible mis-alignment of these hitch parts is in the range of an inch or two. Many drivers lack skill to accurately back the tractor to the ball-clamp on the trailer. Often because the coupling parts of the hitch are hidden from view, some drivers cannot follow instructions given by another person who observes and attempts to direct the coupling operation. Also, many trailers are so large and heavy that most drivers cannot physically "horse" the tractor-trailer even a short distance into alignment of the hitch parts. The weight of the trailer on the usual ground-engaging leg at the trailer front end often forces the leg into the ground or soft paving. Generally there is too much friction to shift the leg laterally or radially enough to bring the ball-clamp to mating relation with the towing ball.

SUMMARY OF THE INVENTION

It is with problems of the nature mentioned above that this invention was made, the main object being to provide shiftable footing means to support said trailer leg such that the leg and its lower end may be easily shifted laterally, or arcuately, thereby to quickly and accurately effect coupling of the parts of a tractor-trailer hitch. Other objects and advantages will become apparent during the course of the following specification in which is disclosed a preferred form of the invention. It will be apparent to those familiar with the problems and skilled in manufacture that changes and alterations as to size, shape or proportion may be desirable. All such as are the fair equivalent to the structure hereafter claimed are intended to be covered by this patent.

DESCRIPTION OF THE DRAWINGS

FIG. 1 is a sketch view of a portion of the front of a trailer showing the mode of assembly and use of the shiftable footing means of this invention;

FIG. 2 is an exploded perspective view of the shiftable footing means of FIG. 1; and FIG. 3 is a diagrammatic view illustrating certain pivoting functions of the shiftable footing or support means.

DESCRIPTION OF THE INVENTION

Trailer 10 has tow-bar structure 12 projecting forwardly from the body and including conventional ball clamp means 14 for engagement about the usual towing ball (not shown) mounted at the rear of a tractor vehicle. Customarily such tow-bar structure 12 has a threaded leg 16 mounted in a nut-like member, part of structure 12. Leg 16 is normally located in a raised position so that its bottom end 18 is clear of the ground when the trailer is being towed over the highway. Crank 20 facilitates rotation of screw leg 16 during raising and lowering operations.

When it is desired to disconnect the trailer from the tractor, the operator usually lowers leg 16 so that its bottom 18 contacts the ground and supports and stabilizes the front end of the trailer. Clamp 14 may then be released from the ball and the tractor driven away. On numerous occasions the leg bottom 18 has been known to sink into soft ground or softened paving due to the weight it sustains. This obviates easy lateral movement of the front of the trailer. The weight sustained is usually such that most operators cannot alone raise the leg from the ground to swing the trailer and move the clamp 14 sideways.

The footing apparatus devised and disclosed herein to overcome these difficulties is essentially in two parts and comprises base plate 22 and foot plate 24. Base plate 22 normally rests on the ground as shown in FIG. 1 and foot plate 24 is interfittingly mounted thereon in a track defined and formed by ways 26, 26 between side flanges or walls 28, 28 medial of ways 26, 26, the base plate is grooved at 30. A plurality of apertures 32 is longitudinally disposed along the track in the bottom of groove 30. Apertures 32 are shown in the preferred form in FIG. 2 to comprise a series of laterally extended longitudinally spaced-apart slots. Naturally, other shapes or forms of apertures 30 will readily occur to those skilled in mechanics.

Base plate 22 may also include a sub-base plate 34 which underlies plate 22 and rests on the ground. Pin-and-socket means 36 pivotally couple plates 22 and 34, so that base plate 22 may be rotated relative the sub-base plate 34 for purposes to be described.

In use footing base plate 22 normally rests on the ground and supports the movable foot plate 24 which in turn receives the bottom end 18 of leg 16. A socket 38 facilitates positioning of leg bottom 18. When the operator has transferred the trailer weight to leg 16 standing on the broad footing, he may uncouple clamp 14 and drive his tractor unit away. When he wishes to re-couple his tractor and trailer he need only back the tractor and its towing ball into close proximal alignment with clamp 14. Then, no longer having to maneuver blind, he may employ a prying tool 40 inserting its pointed or sharpened end 42 into one of the apertures 32 located in groove 30. By forcing tool 40 against an adjacent end of foot plate 24 he easily moves it sideways in the defined track. Notch 25 at either or both ends of foot plate 24 increase access to the apertures 32. It will be observed that the sliding fit of plate 24 in the track can be practically frictionless and, further, that the bar 40 affords the operator a very substantial mechanical advantage. No great strength or dexterity is ordinarily required to shift a large and heavy trailer. And the operator gains considerable advantage in that he can align the ball clamp means 14 to the ball element while they are under close observation by him.

In using the modified form of the invention combining the pivotally coupled sub-base plate 34 with the two-part footing assembly, a certain amount of arcuate movement of the leg 16 is possible. In FIG. 3 it will be seen that the axis of leg 16, e.g. in socket 36, is shifted to the right of the axis of the pivot means 36 and also has been rotated about axis means 36 thus providing dual movement to the right and to the rear, or vice versa, as the case may be.

What is claimed is:

1. In combination with a trailer equipped with means to couple the trailer to the rear of a tractor unit, and said means includes a ground-engaging leg operable to support said trailer when uncoupled from the tractor, shiftable footing means for said leg, comprising:

a base plate means to rest on the ground and shaped at its upper surface to define a track;

a foot plate superposed on said base plate means and shaped to slidingly interfit with said track, said foot plate including means to receive and engage the bottom of said leg; and said base plate means having a plurality of apertures longitudinally disposed along said track and adapted to receive an end of a prying tool operable to exert pressure on said foot plate to slide the same along said track.

2. The combination according to claim 1 in which the base plate means track is in the shape of a groove and said foot plate has a member fitting therein.

3. The combination according to claim 2 in which said plurality of apertures is disposed in the bottom of said groove.

4. The combination according to claim 3 in which said plurality of apertures comprises a series of laterally extended longitudinally spaced apart slots.

5. The combination according to claim 4 in which an end of said foot plate is notched above said track to be engaged by a pry bar.

6. The combination according to claim 1 in which said base plate means includes a base plate and a sub-base plate underlying said base plate in face-to-face relation, and axial means is provided permitting said base plate to rotate relative said sub-base plate.

7. The combination according to claim 1 in which the means to receive the bottom of said leg is a socket recess.

* * * * *